United States Patent
Agarwal et al.

(10) Patent No.: US 10,158,697 B2
(45) Date of Patent: *Dec. 18, 2018

(54) CHANNEL OWNERSHIP IN A PUBLISH-SUBSCRIBE SYSTEM

(71) Applicant: International Business Machines Corporation, Armonk, NY (US)

(72) Inventors: Kanak B. Agarwal, Austin, TX (US); Patrick J. Bohrer, Cedar Park, TX (US); Ahmed Gheith, Austin, TX (US); Michael D. Kistler, Austin, TX (US); Ramakrishnan Rajamony, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/980,539

(22) Filed: May 15, 2018

(65) Prior Publication Data

US 2018/0262555 A1    Sep. 13, 2018

Related U.S. Application Data

(63) Continuation of application No. 15/597,274, filed on May 17, 2017, and a continuation of application No. (Continued)

(51) Int. Cl.
*H04L 29/08* (2006.01)
*H04L 29/06* (2006.01)

(52) U.S. Cl.
CPC .............. *H04L 67/06* (2013.01); *H04L 67/42* (2013.01)

(58) Field of Classification Search
CPC .................................................. H04L 67/1006
See application file for complete search history.

(56) References Cited

U.S. PATENT DOCUMENTS

| 6,393,458 B1 | 5/2002 | Gigliotti et al. |
| 7,139,792 B1 * | 11/2006 | Mishra ............ H04L 63/166 709/203 |

(Continued)

FOREIGN PATENT DOCUMENTS

| CN | 101681489 A | 5/2008 |
| CN | 101650741 A | 8/2009 |

(Continued)

OTHER PUBLICATIONS

List of IBM Patents or Applications Treated as Related, 2018.
Wan Ho et al., Design and Implementation of Middleware System Based on Publish Subscribe Mechanism, 2012.

*Primary Examiner* — Oleg Survillo
*Assistant Examiner* — Christopher P Cadorna
(74) *Attorney, Agent, or Firm* — Garg Law Firm, PLLC; Rakesh Garg; Mercedes L. Hobson

(57) ABSTRACT

To manage channel ownership in a publish-subscribe data processing environment, a determination is made at a first server that a subscription request from a client relates to a channel, the channel having a channel identifier. At an exchange component in a messaging middleware, a session queue associated with the client is bound to the channel. A mandatory delivery message is configured to be routed using a publisher identifier by the exchange component, the publisher identifier being related to the channel identifier. The mandatory delivery message is communicated from the first server to the exchange component to indicate an intent of the first server to become a publisher of the channel. The (Continued)

mandatory delivery message causes the channel ownership of the channel to be limited to a single publisher.

20 Claims, 8 Drawing Sheets

Related U.S. Application Data

14/639,383, filed on Mar. 5, 2015, now Pat. No. 9,800,648.

(56) References Cited

U.S. PATENT DOCUMENTS

| | | | |
|---|---|---|---|
| 2002/0165815 A1 | 11/2002 | Vincent | |
| 2010/0250710 A1* | 9/2010 | Cadwell | H04L 67/1008 709/219 |
| 2014/0032674 A1* | 1/2014 | Nguyen | H04N 21/23103 709/204 |
| 2015/0149585 A1* | 5/2015 | Zhang | G06Q 10/10 709/217 |

FOREIGN PATENT DOCUMENTS

| | | |
|---|---|---|
| CN | 101692656 A | 10/2009 |
| CN | 103404087 A | 2/2011 |
| CN | 103220328 A | 3/2013 |

* cited by examiner

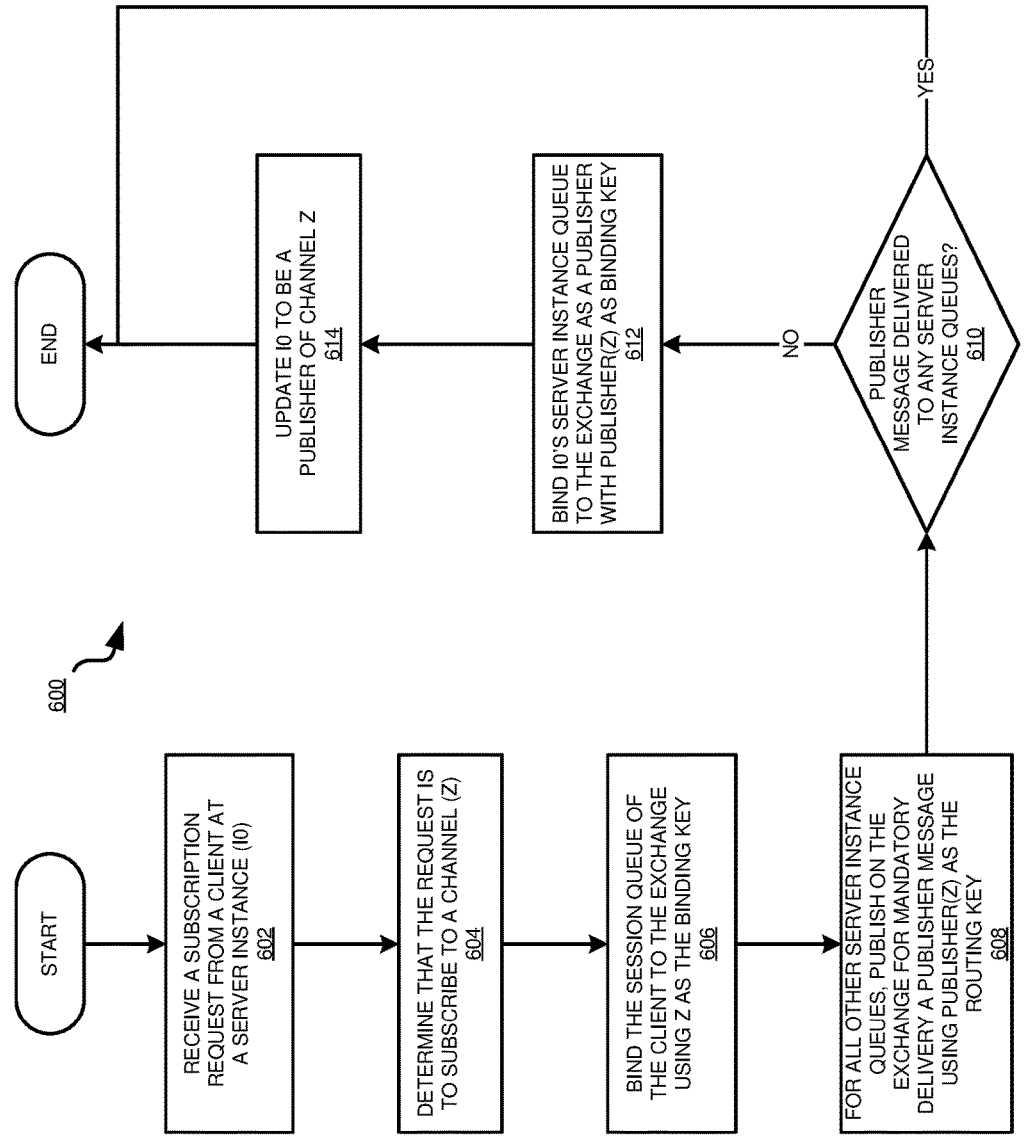

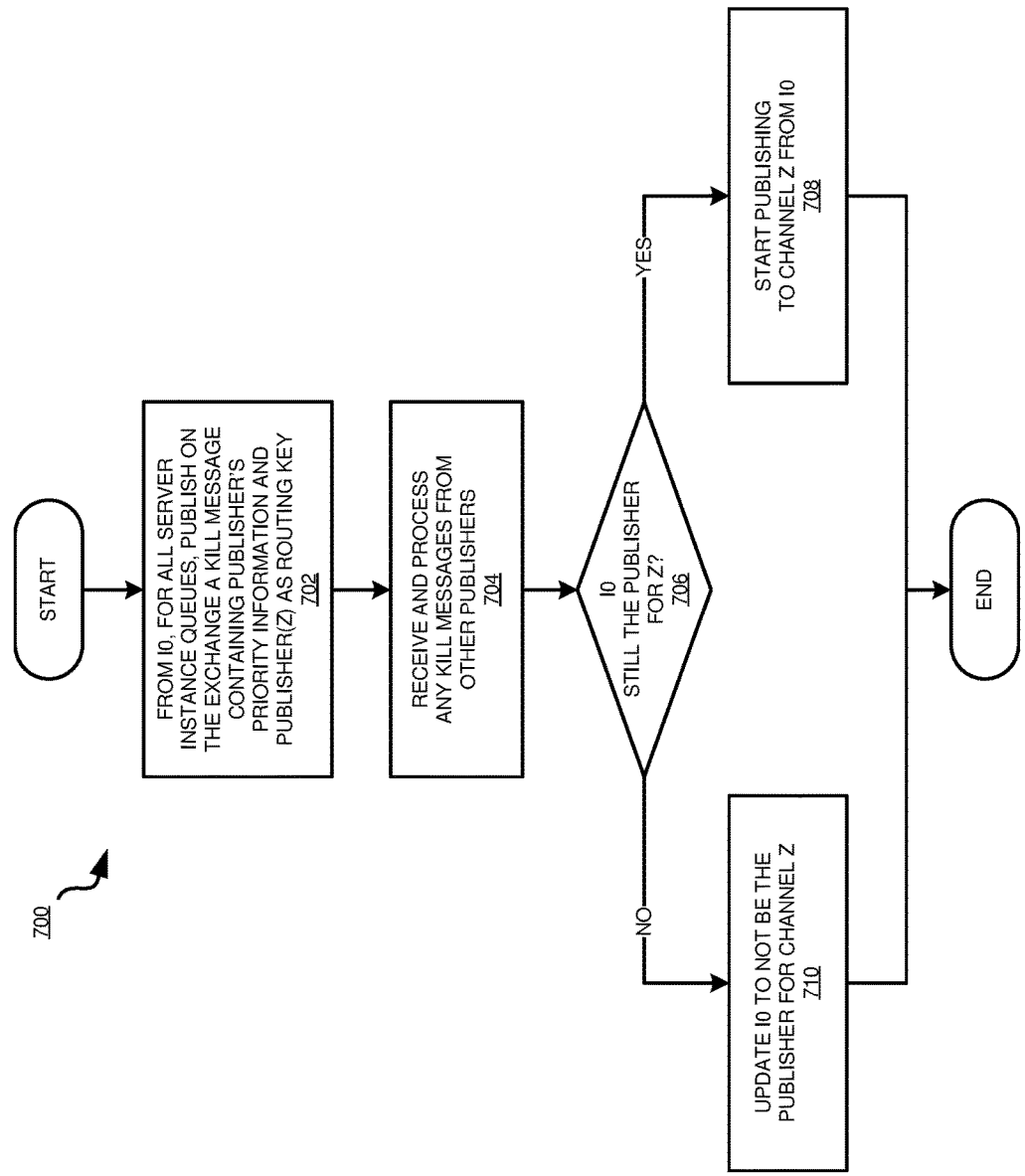

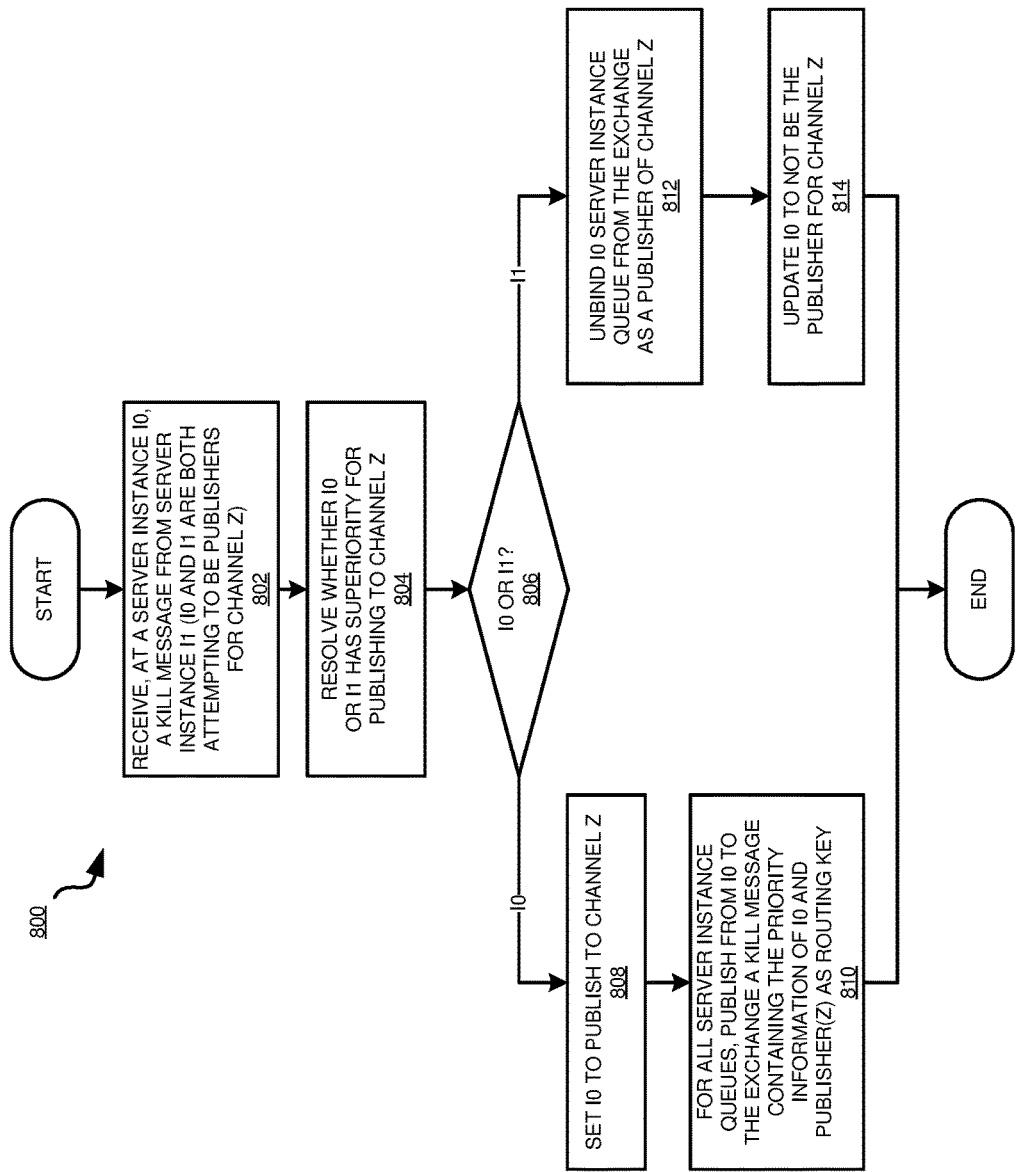

1

CHANNEL OWNERSHIP IN A PUBLISH-SUBSCRIBE SYSTEM

TECHNICAL FIELD

The present invention relates generally to a method, system, and computer program product for managing data requests and responses. More particularly, the present invention relates to a method, system, and computer program product for channel ownership in a publish-subscribe system.

BACKGROUND

Most data communications between two data processing systems involve a request for data and a response containing the requested data. For example, a client data processing system requests data by sending a request message using HyperText Transfer Protocol (http or HTTP) to a server data processing system. The server, using HTTP, sends a response message containing the data to the client.

A client can request data updates on an ongoing basis. For example, in a client-server environment using live query type of requests, a client essentially subscribes to an ongoing feed of data updates from a server-side, or backend, data processing environment. Live query, also known as dynamic query or continuous query, is a method by which a client requests ongoing updates on an event or state of something.

A simple example of live query is a request from a browser to live stock price of a stock ticker, where in response to such a query, a server supplies the browser ongoing updates of the changing stock price of that ticker. To provide ongoing updates in response to a request, a server typically monitors the changes in a database or the changes in the state of an event. The server may monitor these changes by polling the database or periodically observing the event for any changes from previous data in the database or from the previous state of the event.

HTTP protocol only supports a request-response model where clients initiate the requests and the servers respond to the client requests. In the standard HTTP model, a server cannot push responses back to a client without a corresponding request pending from the client. In a live query type publish-subscribe system, servers directly push the content back to clients. This type of operation can be achieved through a protocol, such as websockets, that supports bi-directional communication between client and server.

In a client-server model where clients subscribe to such dynamic content feed generated by the servers, multiple servers can be used for load balancing. One form of load balancing to support horizontal scaling is to use independent servers where the servers are not aware of what other servers are doing for the same or different clients. In a server-side data processing environment, where multiple independent servers with no shared state information about each other operate together to serve numerous requests from numerous clients, an incoming request from a client for subscribing or unsubscribing from receiving such data updates can be routed to any server for processing.

SUMMARY

The illustrative embodiments provide a method, system, and computer program product for channel ownership in a publish-subscribe system. An embodiment includes a method for managing channel ownership in a publish-subscribe data processing environment. The embodiment determines, at a first server, using a processor and a memory, that a subscription request from a client relates to a channel, the channel having a channel identifier. The embodiment causes at an exchange component in a messaging middleware, a session queue associated with the client to bind to the channel. The embodiment configures a mandatory delivery message to be routed using a publisher identifier by the exchange component, the publisher identifier being related to the channel identifier. The embodiment communicates, from the first server to the exchange component, the mandatory delivery message to indicate an intent of the first server to become a publisher of the channel, wherein the mandatory delivery message causes the channel ownership of the channel to be limited to a single publisher.

Another embodiment includes a computer usable program product comprising a computer readable storage device including computer usable code for managing channel ownership in a publish-subscribe data processing environment.

Another embodiment includes a data processing system for managing channel ownership in a publish-subscribe data processing environment.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 6 depicts a flowchart of an example process for channel ownership in a publish-subscribe system in accordance with an illustrative embodiment;

FIG. 7 depicts a flowchart of an example process to resolve simultaneous or near simultaneous multiple publisher race condition in accordance with an illustrative embodiment; and FIG. 8 depicts a flowchart of an example process to eliminate duplicate publisher in accordance with an illustrative embodiment.

DETAILED DESCRIPTION

Figure 1:
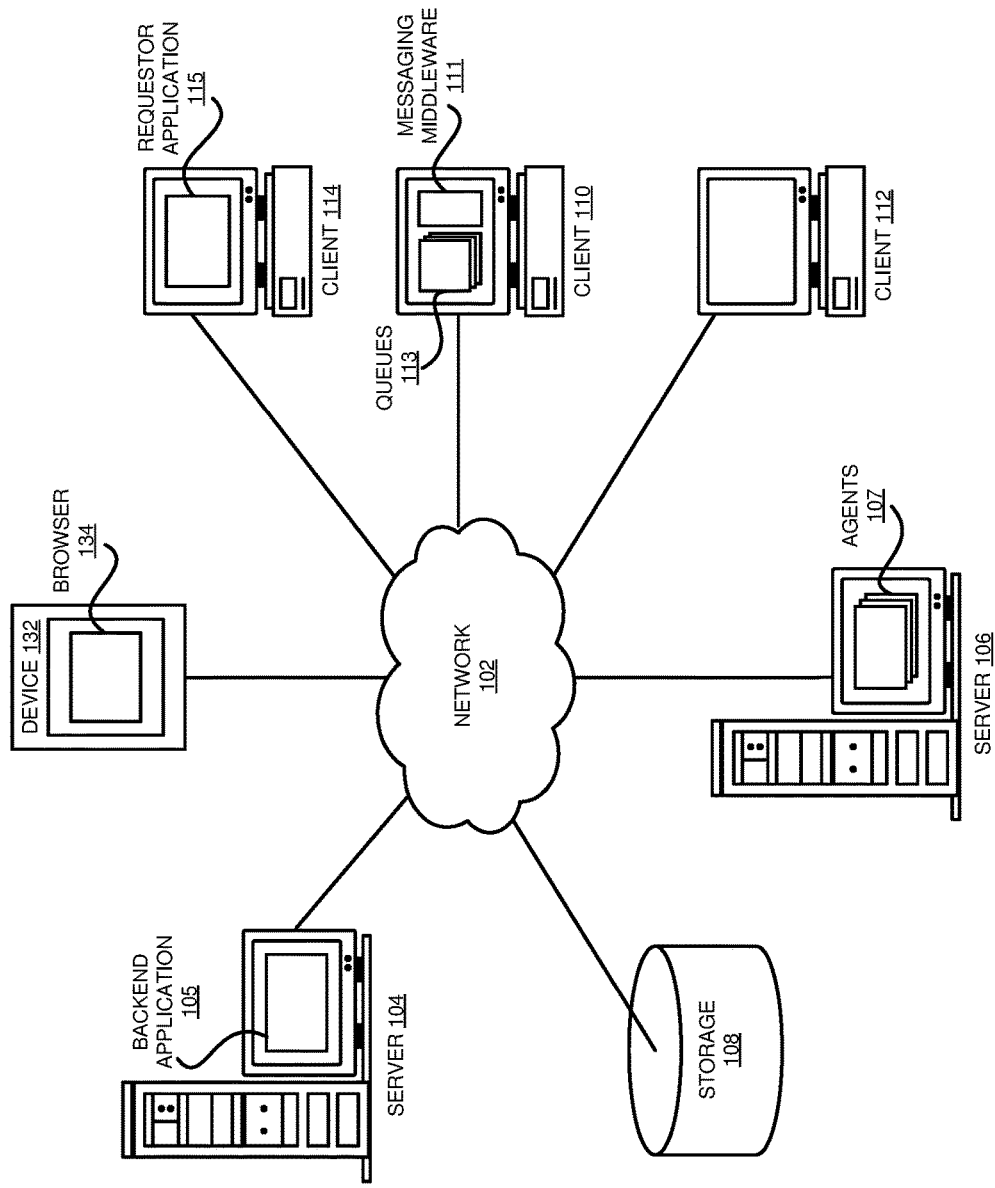
FIG. 1 depicts a block diagram of a network of data processing systems in which illustrative embodiments may be implemented.

The illustrative embodiments recognize that in a client-server environment where clients subscribe to data feeds, multiple servers can end up performing duplicative work that is wasteful of the resources. For example, in such environments, it is likely that multiple servers could be processing for the same data or events to publish the same data updates or feeds in response to similar requests from different clients.

The illustrative embodiments further recognize that the duplicative work on the server-side is also confusing on the client-side. For example, in some cases, it is also possible that the same client sends a request and a re-request for the same query, and different servers end up processing the request and the re-request. Thus, more than one servers can start publishing duplicate data feeds, which can confuse or disrupt an operation on the client-side.

The illustrative embodiments used to describe the invention generally address and solve the above-described problems and other problems related to managing data requests and responses. The illustrative embodiments provide a method, system, and computer program product for scalable and self-healing architecture for channel ownership in a publish-subscribe system.

The embodiments described herein are adaptable to other types or requests and responses using HTTP or other protocols. The embodiments described herein are also adaptable for use not only with mobile devices but also with other data processing system and environments where the publish-subscribe model for client-server communications can be used.

In some embodiments, a requestor system is described as a client and a responding system is described as a server without implying any particular client-server configuration or architecture. A client is simply a consumer of data and a server is simply a supplier of data, and a system that is a client in one exchange could very well be the server (or backend) in another exchange, and vice versa. Typically, servers operate in a backend data processing environment and are accessed over a data network from applications executing at client systems. The backend data processing environment—also referred to herein as the server-side data processing environment—comprises applications and systems to receive the data requests, repositories of data from which to provide data in response, applications whose services are requested in some requests, security applications, middleware applications and platforms, and many other systems and applications.

An embodiment can be implemented as an application in software, hardware, or firmware, to operate in the backend data processing environment. Some operations of some embodiments described herein can be implemented in a server, such as by modifying a server application to perform those operations. Generally, within the scope of the illustrative embodiments, the operations and functions of an embodiment can be implemented in a stand-alone manner or in conjunction with other applications executing in the backend data processing environment. For example, an application implementing an embodiment can be configured to operate as a modification of a server, a modification of a messaging middleware, a stand-alone application usable by a server, a stand-alone application usable by a messaging middleware, or some combination thereof.

In operation, typically, several servers in a load-sharing configuration provide the same type of service to numerous clients. According to an embodiment, each load-sharing server operating in such a publish-subscribe client-server architecture is capable of establishing a channel, publishing content—including ongoing updates—to that channel, and binding clients to listen to the content published on the channel.

The server establishes the channel based on the query or type of request (hereinafter referred to as "query") from the client. Essentially, within the scope of the illustrative embodiments, a channel is simple a manner of establishing correspondence between a query and the published content. For example, assume that the query has an identifier. A server uses the query identifier as a channel identifier. Publishing content to the channel includes identifying the content with the identifier so that a client listening to the channel can establish the correspondence between the query and the content.

In one embodiment, the request message specifies the query identifier and the server uses the specified identifier of the specified query as a channel identifier. In another embodiment, the request message specifies the query and the server uses a suitable method to determine an identifier of the specified query, such as by generating a hash value of the query or by looking up the query in a catalog. The server then uses the determined query identifier as a channel identifier.

A server can then bind the requesting client to listen to updates published on the channel. A client that is bound to a channel receives the content that is published on that channel without having to poll or send a request for the content. As will be described in this disclosure, a messaging middleware maintains a session queue for a client. The binding of the client to a channel comprises configuring a path in the middleware such that content published with the channel identifier can be placed in the client's session queue.

A client initiates a data communication session by sending a handshake message to a backend data processing environment. The backend data processing environment implements one or more agent applications, one of which establishes a session identifier for the session and responds to the client's handshake message. For the remainder of the data communications between the client and the backend, the client is expected to use the session identifier.

Using the session identifier, the client sends a request, such as a request for data and ongoing updates, to the backend data processing environment. An agent determines from the message header the query in the request. For example, one request may ask for a database service where a database has to provide updates on some changing data in response. As another example, another request may ask for a news or stock feed service where a server application may have to access a data source to obtain and supply the data and the updates. As another example, a request may ask for a notification service where a backend application has to supply information of an event when changes in the event are detected. Many other types of services can similarly be the subject of the query in a request message.

A message-oriented middleware is any suitable application that enables two or more applications to communicate with each other via message queues (MQ). A variety of message-oriented middleware, also referred to herein as messaging middleware or MQ middleware, are presently available and in use in backend data processing environments. MQ-Series and RabbitMQ are some examples of commercially available messaging middleware that facilitate such communications between applications (MQ-Series is a trademark of International Business Machines Corporation in the United States and other countries, RabbitMQ is an open source software distributed by Pivotal Software, Inc., under Mozilla Public License).

A messaging middleware allows one or more applications to publish one or more messages for one or more other applications in a message queue. The other applications subscribe to the queue. When a message is published to the queue, all subscribers, or a subset of the subscribers, to the queue can receive the published message. The subset of subscribers that receive a message is determined by a combination of the policies ascribed to the queue and by the message contents themselves.

The set of one or more agent applications maintain a set of service queues. A service queue in the set of service queues is configured to receive publications of requests having only a specific queries. For example, one service queue may be associated with monitoring a particular data in a database, another service queue may be associated with a news feed service, and another service queue may be associated with monitoring an event.

Depending upon the service being requested in a request message query, an agent publishes the request to the service queue associated with that service. Those servers or backend applications, which provide the requested service, subscribe to the service queue for that service. One of the subscriber backend applications takes up the request from the service queue. That subscriber backend application processes the request and produces a response with the requested content.

An agent determines whether a session queue for the requestor client has already been created in the messaging middleware. A session queue is usable by a server to publish responses that have to be delivered to the client. Whenever a server or backend application has data to send to the client, the server or the backend application publishes that data to the session queue for the client. The client is the ultimate subscriber to the session queue with an agent acting as the intermediary who will forward the message. When data is published to the session queue, the subscribing client receives the data via an agent.

In certain circumstances, a server can create a session queue and publish the response to the queue for delivery to a client. To avoid creating multiple session queues for the same session for the same client, before an agent creates a session queue, the agent checks whether a session queue already exists for the client and the session. If a session queue already exists, the agent simply binds to the existing session queue.

Thus, multiple agents can bind to the same session queue. When a response is posted to the session queue by a server or backend application, any one of the agents that are bound to the queue can send the published response to the subscribing client When a subscribing client does not access a session queue for a queue timeout period, an embodiment purges the queue and the remaining messages therein. If a message is posted to a session queue, and a subscribing client does not pick up or receive the posted message, a message timeout timer purges that posted message from the session queue.

Within the messaging middleware, each server also maintains a server instance queue. The server instance queues are used for communications between the servers. Such internal communications between servers do not maintain any state information about each other.

In the architecture described above, an exchange is a messaging middleware function. An exchange comprises logic to route messages to queues. A server publishes a message to the exchange in order to have the message published to one or more queues.

For example, a server publishes content to a channel by publishing the content with the channel information to the exchange, and the exchange routes the content of the channel to those session queues that are bound to the exchange to consume messages for that channel. As another example, a server indicates itself to be a publisher of a channel by publishing a publisher message with the channel information to the exchange, and the exchange routing the publisher message related to the channel to the server instance queues as described in this disclosure. As another example, a server attempts to make itself the sole publisher or the leader publisher of a channel by publishing a kill message with the channel information to the exchange, and the exchange routing the kill message related to the channel to the server instance queues as described in this disclosure.

With this architecture in place, an embodiment receives a subscription request from a client. The embodiment determines that the request pertains to a particular channel, e.g., channel Z. If multiple clients request the same query, multiple clients could be requesting subscription to channel Z in this manner.

An agent queues the request in a suitable service queue according to the query in the request. From a set of servers that process that query, a server instance—e.g., server I0—picks up the request from the service queue. Server I0 binds the session queue of the requesting client with the exchange for channel Z. In other words, when server I0 publishes content on channel Z to the exchange, the exchange routes and stores the channel Z content in the client's session queue. If more than one client were subscribed to channel Z, then the exchange would route and store the content published on channel Z to the session queues of each such subscribing client in a similar manner.

An embodiment further operates to ensure that server I0 is the sole or the leader server publishing on channel Z to avoid the duplicative efforts problem described earlier. When more than one servers appear to be publishing to the same channel, another embodiment operates to select a leader server from the multiple publishing servers to avoid the duplicative efforts problem.

A method of an embodiment described herein, when implemented to execute on a device or data processing system, comprises substantial advancement of the functionality of that device or data processing system in managing data requests and responses. For example, in order to manage client-server communications, the prior-art allows the possibility of duplicative and wasteful efforts on the server-side. In contrast, an embodiment configures and operates a publish-subscribe client-server architecture where the load-sharing servers can avoid duplicative efforts on the server-side and avoid simultaneous publication of duplicate content to clients, all while remaining stateless relative to one another. Such manner of data request management in publish-subscribe environments is unavailable in presently available devices or data processing systems. Thus, a substantial advancement of such devices or data processing systems by executing a method of an embodiment allows for a scalable stateless backend environment, which significantly reduces wasteful duplicative server resource consumption for publishing data and data updates to clients.

The illustrative embodiments are described with respect to certain architectures, middleware, protocols, messages, identifiers, networks, parameters, timeouts, conditions, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures thereof, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments.

Furthermore, a particular illustrative embodiment may have some, all, or none of the advantages listed above.

Figure 2:
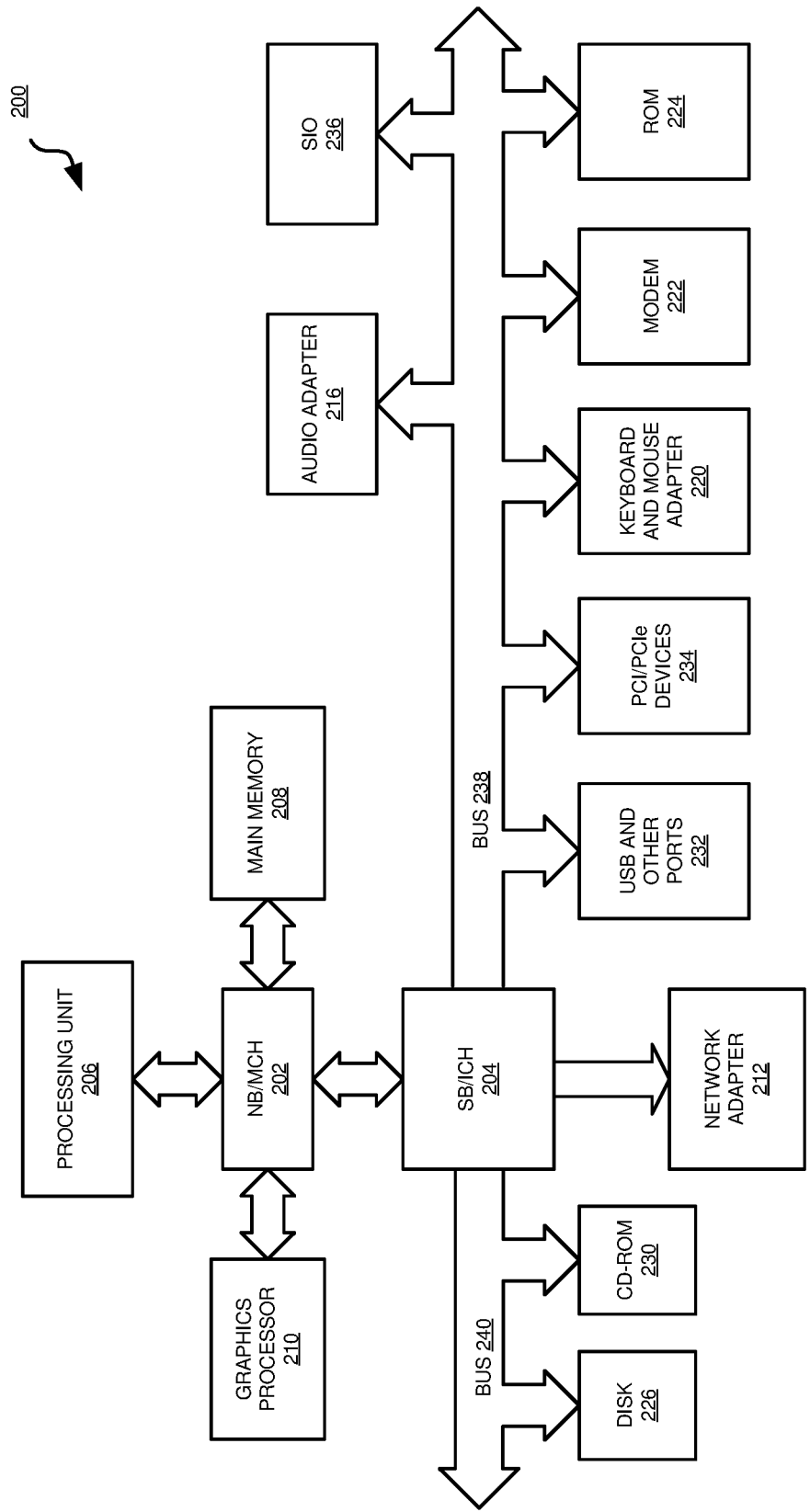
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wired, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment.

For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner. Backend application 105 in server 104 comprises any application, including but not limited to a server application or a service application, which responds to a request from a client application. Device 132 is a non-limiting example of a client, and browser 134 in device 132 is a non-limiting example of a client application. Requestor application 115 in client 114 is another example of a client application. Requestor application 115 or browser 134 sends a request to which backend application 105 responds. One or more agent applications 107 in server 106 receive the request from client application 115 or 134, queue the request according to the type of service requested, create session queues, and pass responses to client application 115 or 134 as described elsewhere in this disclosure. Messaging middleware 111 provides the queuing and publish-subscribe functionality in the manner described in this disclosure. For example, messaging middleware 111 facilitates the creation and operation of queues 113. A queue in queues 113 may be a service queue (not shown), another queue in queues 113 may be a session queue (not shown), and another queue in queues 113 may be a server instance queue (not shown). Messaging middleware 111 also implements an exchange function (not shown), which is usable in the manner described in this disclosure. Within the scope of illustrative embodiments, a server or server instance operating in conjunction with an embodiment comprises backend application 105. An embodiment can be implemented within or in conjunction with backend application 105, within or in conjunction with messaging middleware 111, as another application (not shown), or some combination thereof.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also be viewed as employing a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, or another type of device in which computer usable program code or instructions implementing the processes may be located for the illustrative embodiments.

Data processing system 200 is also representative of a data processing system or a configuration therein, such as device 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive or solid-state drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as agents 107, backend application 105, or messaging middleware 111 in FIG. 1 are located on storage devices, such as hard disk drive 226 or a solid-state data storage device, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a mobile computing device, which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
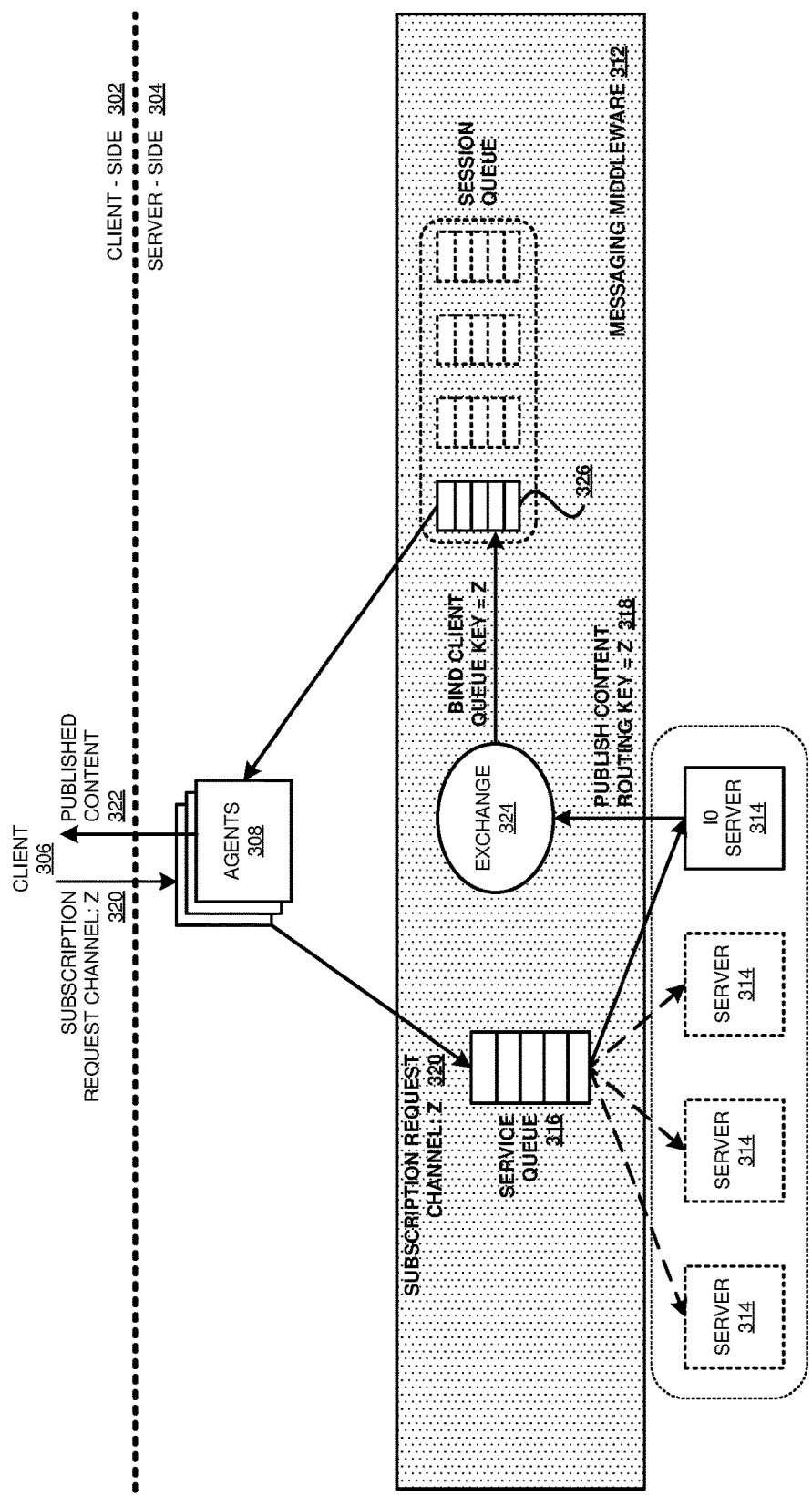
FIG. 3 depicts a block diagram of an example configuration for ongoing publishing of content in a publish-subscribe client-server environment in accordance with an illustrative embodiment.

With reference to FIG. 3, this figure depicts a block diagram of an example configuration for ongoing publishing of content in a publish-subscribe client-server environment in accordance with an illustrative embodiment. The dashed line dividing client-side 302 and server-side 304 represents a data network, such as network 102 in FIG. 1. Client-side 302 represents data requestors, such as client application 306 (client application is also interchangeably referred to herein as "client"). Client application 306 is an example of browser 134 or requestor application 115 in FIG. 1.

Server-side 304 represents the server-side data processing environment where backend applications and servers that respond to queries in client requests, and other server-side architecture components to support their functions operate. A set of several agents 308 is depicted as an example. An instance of agent 308 is an example of agent 107 in FIG. 1. Optionally, a load balancer (not shown) or another suitable distribution method can be employed to distribute the inbound requests from client-side 302 amongst several agents 308.

Messaging middleware 312 is an example of messaging middleware 111 in FIG. 1. Servers 314 comprise a set of servers, server applications, or backend applications that provide a particular service requested in some client requests. As a non-limiting example, server 314 may operate as redundant or load-sharing servers to provide a database service to process a particular type of query associated with channel Z. Other sets of servers (not shown) may similarly be configured on server-side 304 to provide other services associated with other queries and requests in a similar manner.

Service queue 316 holds those client requests that request the service provided by a server instance in servers 314. For example, client application 306 and other client applications (not shown) may send a subscription request for certain data from a database. An agent from agents 308 receives one such request, identifies the requested service, determines that service queue 316 is associated with the requested service, and posts the request in service queue 316. Servers 314 subscribe to service queue 316. A server from servers 314 detects the posting of the subscription request to service queue 316, and removes that request from service queue 316 for processing.

Note that each of servers 314 operates in a stateless manner. In other words, a server in servers 314 does not maintain any session or state information to have any particular affinity with any particular client application, or another server. A server in servers 314 simply receives a subscription request from service queue 316 and processes the request. The received request can be from any client application executing in any client data processing system.

In operation, client application 306 begins by sending subscription request 320 to server-side 304. Subscription request 320 requests a query that corresponds to a channel, e.g., channel Z. Agent 308 queues request 320 into service queue 316. Server instance I0 from servers 314 receives request 320.

In message 318, server I0 publishes content on exchange 324 with channel Z and also binds session queue 326 of client 306 to exchange 324 as a consumer of channel Z. As an example, server I0 publishes message 318 on exchange 324 by using a routing key with message 318, where the routing key is set to the channel identifier, which in the example here is Z.

Suppose that session queue 326 is associated with client 306. Exchange 324 binds session queue 326 to channel Z. Exchange 324 can bind session queue 326 to any number of different channels for client 306 in a similar manner. Similarly, exchange 324 can bind any number of session queues that are associated with any number of different clients to channel Z and/or any number of different channels in a similar manner.

Assuming for the purposes of FIG. 3 that server I0 is the only publisher on channel Z, server I0 publishes or continues publishing content to channel Z. Exchange 324 routes the published content of channel Z to session queue 326, which an agent in agent 308 delivers to client 306 as published content 322.

Figure 4:
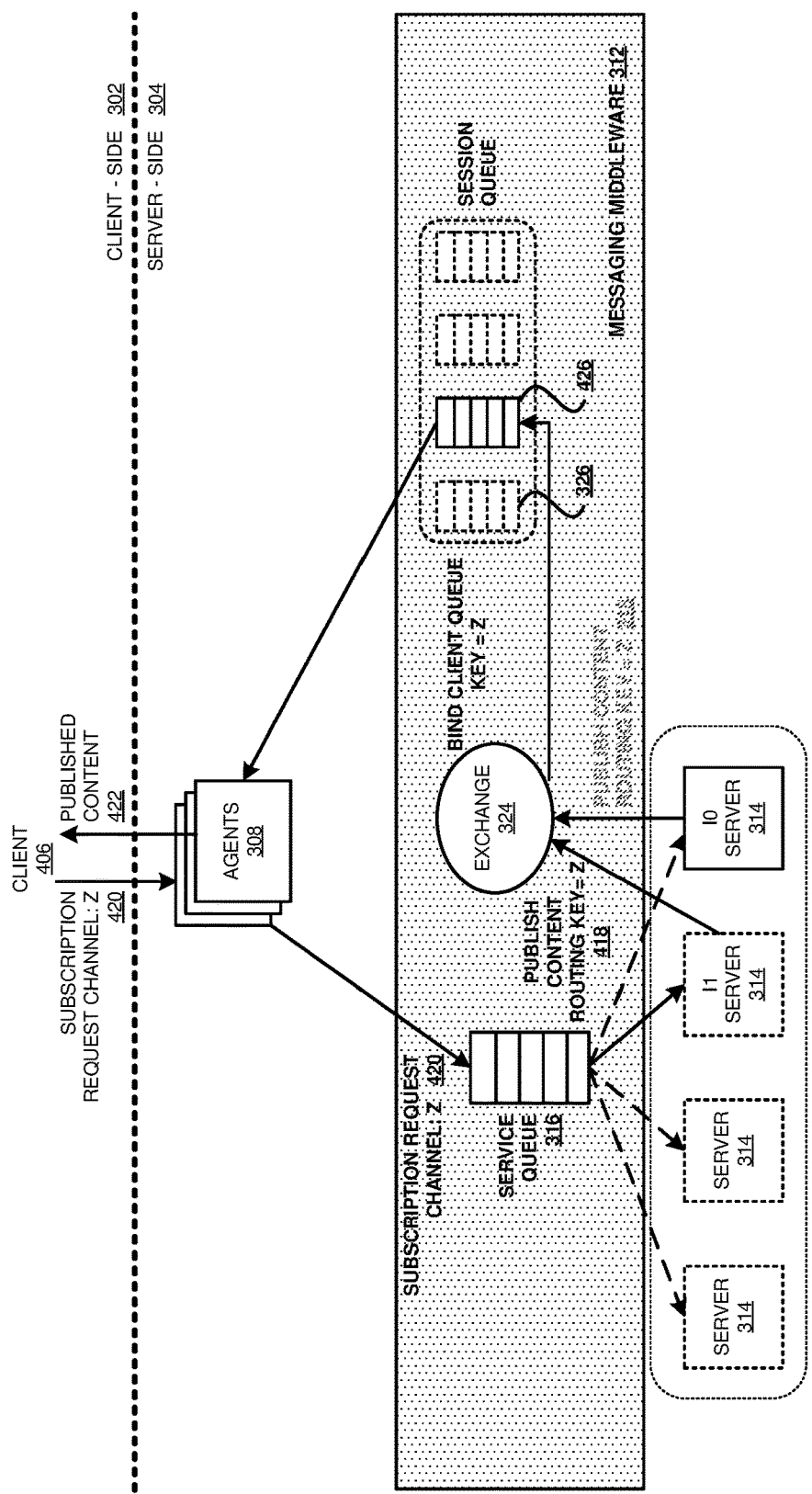
FIG. 4 depicts a block diagram of a condition in channel ownership in a publish-subscribe system in accordance with an illustrative embodiment.

With reference to FIG. 4, this figure depicts a block diagram of a condition in channel ownership in a publish-subscribe system in accordance with an illustrative embodiment. Depicted artifacts with reference numerals reused from FIG. 3 are the same artifacts as described with respect to FIG. 3.

As described with respect to FIG. 3, at one point in time, server I0 has become a publisher on channel Z and client 306 is subscribed to channel Z via session queue 326. Now, suppose that another client, client 406 sends subscription request 420. An agent in agents 308 queues request 420 in service queue 316 for one of servers 314 to pick up. Because any of servers 314 can potentially pick up and process the requests from service queue 316, assume that server instance I1 receives and removes request 420 from service queue 316.

To illustrate a possible channel ownership problem in a publish-subscribe system, assume that request 420 also relates to the same query as in request 320 from client 306 in FIG. 3. Therefore, request 420 also corresponds to channel Z. Because servers 314 are stateless, server I1 does not have the information to know that server I0 is already a publisher of channel Z due to message 320. Therefore, in message 418, server I1 publishes content on exchange 324 for channel Z and also binds session queue 426 of client 406 to exchange 324 for channel Z. As an example, server I1 publishes message 418 on exchange 324 by using a routing key with the message 418, where the routing key is set to the channel identifier, which in the example here is Z. Accordingly, exchange 324 binds session queue 426 to channel Z.

Now, session queues 326 and 426 are bound to channel Z. Because server I0 had previously become the publisher of channel Z due to client message 320, server I0 continues to publish to channel Z and the subscribers of channel Z receive server I0's publications to channel Z. Because server I1 had become the publisher of channel Z due to client message 320, server I1 continues to publish to channel Z and the subscribers of channel Z receive server I1's publications to channel Z as well.

As can be seen, unbeknownst to servers I0 or I1, both servers are expending resources for computing the query of channel Z and publishing the same resulting content to channel Z. The subscribers of channel Z are therefore receiving duplicate content—one published by server I0 and another published by server I1.

Figure 5:
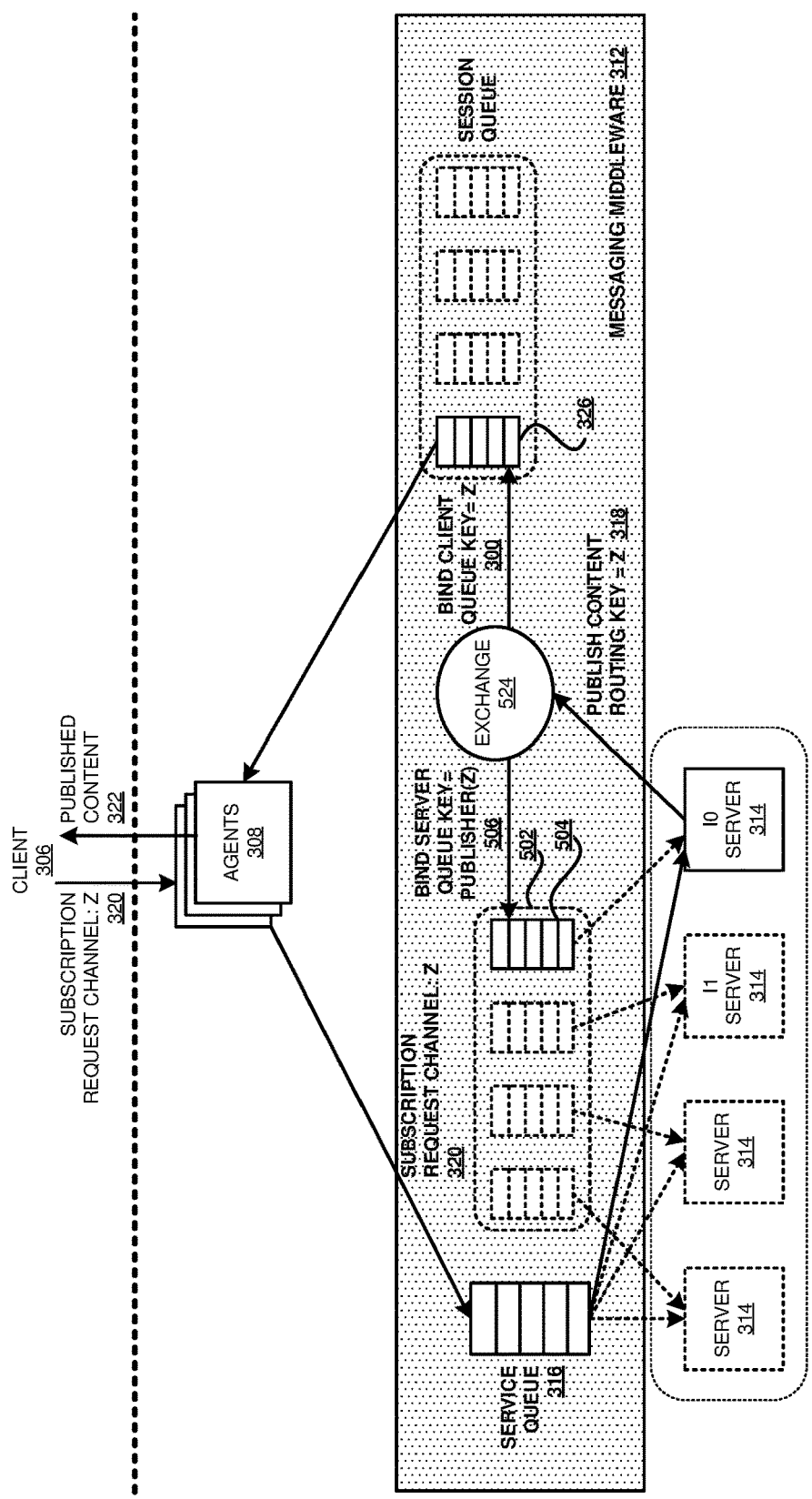
FIG. 5 depicts a block diagram of a configuration to resolve a channel ownership problem in a publish-subscribe system in accordance with an illustrative embodiment.

With reference to FIG. 5, this figure depicts a block diagram of a configuration to resolve a channel ownership problem in a publish-subscribe system in accordance with an illustrative embodiment. Depicted artifacts with reference numerals reused from FIGS. 3 and 4 are the same artifacts as described with respect to FIG. 3.

According to an embodiment, each of servers 314 has a corresponding server instance queue in server instance queues 502. For example, server instance queue 504 corresponds to server I0.

Exchange 524 operates in the manner of exchange 324 and further as described with respect to FIG. 5. When server I0 becomes publisher of channel Z, server I0 also binds (506) server instance queue 504 with exchange 524 to receive messages having publisher (Z) as a key. Publisher(Z) is simply a stand-in for a known server-side function applied to channel identifier Z, e.g., to result in an identifier Z'. Z' corresponds to channel Z through some function "publisher". Essentially, when server I0 sends a message to exchange 524 with a routing key of Z, exchange 524 routes those messages to any subscribing client session queues that are bound to exchange 524 with binding key Z. When server I0 sends a message to exchange 524 with a routing key of Z', exchange 524 routes those messages to any subscribing server instance queues that are bound to exchange 524 with a binding key Z'. Publisher(Z) is also referred to herein as "publisher of channel identifier Z" or Z' when used in a routing context from any of servers 314 to exchange 524.

Now, as a result of binding 506, exchange 524 has at least one server instance queue in queues 502 that is subscribed to messages having publisher of channel identifier Z, to wit, Z', as a key and where certain mandatory delivery messages having Z' as a key, as described herein, can be delivered. A mandatory delivery message is a message that must be delivered to at least one recipient or subscriber queue of the channel, or else must be returned to the sender by messaging middleware.

One type of mandatory delivery message is an "intent to become publisher" message (also referred to herein as a "publisher message") with Z' as the routing key, which a server instance in servers 314 can send to exchange. If any server instance queue is subscribed to receiving messages that have Z' as the routing key, the publisher message is delivered to that other server instance queue, otherwise the publisher message is returned to the sender server instance.

For example, when server I0 determines that server I0 should become the publisher of channel Z, server I0 sends a intent to become publisher message with routing key as Z', the exchange delivers the message to any other server instance queues that have subscribed to receive messages that have Z' as the routing key. If no such other server instance queue is bound to the exchange with binding key Z', the exchange returns the intent to become publisher message back to server I0.

If the intent to become publisher message is delivered to some subscriber queue, the delivery operates as an indication to server I0 that there is another server that is a publisher of channel Z. Server I0 then yields to the existing publisher server.

If the intent to become publisher message is not delivered to any subscriber queue, exchange 524 returns the publisher message to server I0. The failed delivery operates as an indication to server I0 that there is no another server that is a publisher of channel Z. Server I0 then binds, using binding key Z', server I0's server instance queue 504 to exchange 524 as publisher of channel Z and also updates an internal indicator in server I0 to indicate that server I0 is the publisher for channel Z.

The intent to become publisher message seeks to resolve a conflict between an existing publisher server of a channel and another server that is trying to become a publisher server of the same channel. In some cases, however, a race condition situation may arise when there is no existing publisher server but two or more servers simultaneously or nearly simultaneously try to become the publishers of the same channel. Such simultaneous or near simultaneous conflict is not effectively resolved with just intent to become publisher messages.

Another type of mandatory delivery message is a kill message with a publisher of channel identifier, e.g., Z', as the routing key, which a server instance in servers 314 can send to exchange. The kill message also includes some information of the sender server such that the sender server's priority relative to a receiver server's priority can be established. If any server instance queue is subscribed to receiving messages that have that publisher of channel identifier, e.g., Z', as the routing key, the kill message is delivered to that other server instance queue, otherwise the kill message is returned to the sender server instance. For example, if server I0 sends a kill message with Z' as the routing key, the exchange delivers the message to any server instance queues that have subscribed to receive messages that have Z' as the routing key. If no such other server instance queue is bound to the exchange for Z' key, the exchange returns the kill message to server I0.

Within the scope of the illustrative embodiments, any suitable information of a server, which is usable to establish the relative priorities of two servers, can be used in a kill message. For example, and without implying any limitation thereto, one such information can be the identifiers of the servers. Different servers have different identifiers, and some ordering of the server identifiers can be used to determine that server 1 has a higher priority than server 2, e.g., because 1 is a lower number than 2, or vice versa. Similarly, different servers can have different priorities, age, location in a data processing environment, available capacity, utilization, and many other types of information that can be compared between two servers to determine which server has a higher priority at a given time. Any information specific to a server and usable to establish the server's priority relative to another server is usable within the scope of the illustrative embodiments.

Once a server becomes a publisher of a channel, there exists a possibility that another server also simultaneously became a publisher of the same channel as described above. To avoid such simultaneous conflict, the publisher server sends a kill message.

Assume that server I0 and server I1 both try to become publishers of channel Z simultaneously or near simultaneously. Server I0 and I1 had both sent intent to become publisher messages to the exchange near simultaneously. These messages were returned back to the corresponding servers indicating that there is no existing publisher of the channel. Both server I0 and I1 had then updated their internal state to indicate themselves as the publisher of the channel. But before assuming the role of publisher and starting the actual task of publishing on the channel, server I0 and server I1 send kill messages to avoid race condition problem. Server I0 sends a kill message K0 with Z' as routing key and, for example, server I0's identifier 0. Server I1 receives kill message K0. Similarly, server I1 sends a kill message K1 with Z' as routing key and, for example, server I1's identifier 1. Server I0 receives kill message K1.

Using K0, server I1 compares server I1's own identifier "1" with the identifier of sender of K0—"0". Assuming that in the identifier ordering scheme used in the data processing environment, the lower the number the higher is the priority, server I1 concludes that server I0 has priority over server I1.

Accordingly, server I1 unbinds its server instance queue from exchange 524 for Z' and updates its internal state to stop being a publisher of channel Z. Similarly, using K1, server I0 compares server I0's own identifier "0" with the identifier of sender of K1—"1". Server I0 concludes that server I0 has priority over server I1. Accordingly, server I0 keeps its server instance queue 504 bound to exchange 524 with binding key Z' and maintains its internal state as publisher of channel Z.

Both server I0 and server I1 check their internal state after a configured amount of time. The internal state of server I0 shows that it is still the publisher for channel Z while the internal state of server I1 shows that it is no more the publisher of channel Z. Consequently, server I0 assumes the publisher role for channel Z and starts publishing while server I1 does not. Thus, even a simultaneous publisher conflict is resolved.

With reference to FIG. 6, this figure depicts a flowchart of an example process for channel ownership in a publish-subscribe system in accordance with an illustrative embodiment. Process 600 can be implemented in a server, such as server I0 in FIG. 3, 4, or 5, where the server is either modified to perform an operation described herein or the server operates in conjunction with an application that implements an operation described herein.

The server, e.g., server instance I0, receives a subscription request from a client (block 602). The server determines that the request is to subscribe to a channel, e.g., channel Z (block 604). The server binds the session queue of the client to the exchange using Z as the binding key (block 606).

For all other server instance queues, the server publishes on the exchange, for mandatory delivery, an intent to publish message using publisher(Z), to wit, Z', as the routing key (block 608). The server determines whether the intent to publish message was delivered to any server instance queues, or alternatively, whether the intent to publish message has not been returned as undelivered (block 610). If the intent to publish message was not delivered, i.e., returned, ("Yes" path of block 610), the server ends process 600 thereafter.

If the intent to publish message was not delivered, i.e., returned, ("No" path of block 610), the server binds its server instance queue to the exchange as a with key Z' (block 612). The server saves information, such as an internal state information about itself, indicating that server I0 is the publisher of channel Z (block 614). The server ends process 600 thereafter, or proceeds to process 700 in FIG. 7.

With reference to FIG. 7, this figure depicts a flowchart of an example process to resolve simultaneous or near simultaneous multiple publisher race condition in accordance with an illustrative embodiment. Process 700 can be implemented in a server, such as server I0 in FIG. 3, 4, or 5, where the server is either modified to perform an operation described herein or the server operates in conjunction with an application that implements an operation described herein.

The server, e.g., server instance I0, publishes on the exchange for any other subscriber server instance queues, a kill message containing the publisher's priority information with the routing key as publisher(Z), e.g., Z' (block 702). The server receives and processes any kill messages from any other server that is a publisher of channel Z (block 704). After a period of time passes, such as a period within which the server should have received all kill messages that could come, and the server has established its own relative priority amongst all senders of kill messages, the server determines whether the server still remains the publisher of channel Z, (block 706).

If the server is still the publisher for channel Z, i.e., server I0 has the highest relative priority amongst all concurrent publishers of channel Z, ("Yes" path of block 706), the server starts publishing to channel Z (block 708). The server ends process 700 thereafter.

If the server is not longer the publisher for channel Z, i.e., server I0 does not have the highest relative priority amongst all concurrent publishers of channel Z, ("No" path of block 706), the server updates information about server's own state to indicate that the server is not the publisher of channel Z (block 710). The server ends process 700 thereafter.

With reference to FIG. 8, this figure depicts a flowchart of an example process to eliminate duplicate publisher in accordance with an illustrative embodiment. Process 800 can be implemented in a server, such as server I0 in FIG. 3, 4, or 5, where the server is either modified to perform an operation described herein or the server operates in conjunction with an application that implements an operation described herein.

The server, e.g., server instance I0, which is a publisher of an example channel Z, receives a kill message from another server that is also a publisher of the same channel, e.g., server I1 (block 802). The server resolves in a manner described earlier, which of server I0 and server I1 has superiority or priority relative to one another (block 804).

If the server determines that I0 has the priority ("I0" path of block 806), the server sets an internal state to indicate that server I0 is the publisher of channel Z (block 808). The server publishes on the exchange for any other subscriber server instance queues, a kill message containing the publisher's priority information with the publisher(Z) as routing key, e.g., Z' (block 810). The server ends process 800 thereafter. The kill message is processed in the manner of process 700 in FIG. 7.

If the server determines that I1 has the priority ("I1" path of block 806), the server unbinds the server's server instance queue from the exchange as a publisher of channel Z (block 812). The server updates an internal state to indicate that server I0 is not the publisher of channel Z (block 814). The server ends process 800 thereafter.

The illustrative embodiments have been described using certain examples messages only for the clarity of the description and not as a limitation on the illustrative embodiments. From this disclosure, those of ordinary skill in the art will recognize that the illustrative embodiments described herein are agnostic to the specific transport protocol used to communicate requests and responses between clients and servers, and can be adapted to operate with HTTP or other protocols, and the same is contemplated within the scope of the illustrative embodiments.

Thus, a computer implemented method, system or apparatus, and computer program product are provided in the illustrative embodiments for channel ownership in a publish-subscribe system. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for managing channel ownership in a publish-subscribe data processing environment, the method comprising:

determining, at a first server, using a processor and a memory, that a subscription request from a client relates to a channel, the channel having a channel identifier;

causing, at an exchange component in a messaging middleware, a session queue associated with the client to bind to the channel;

indicating an intent of the first server to become a publisher of the channel by communicating from the first server a mandatory delivery message to be routed by the exchange component using a publisher identifier, the publisher identifier being related to the channel identifier;

configuring a kill message with a priority information corresponding to the first server, wherein the priority information comprises a server instance information usable to establish a priority of the first server relative to a second server for the channel, wherein the first server and the second server are both attempting to become publishers of content on the channel;

communicating, from the first server to the exchange component, the kill message to be routed by the exchange component using a publisher identifier to a set of server instance queues corresponding to a set of other servers; and beginning, responsive to the first server remaining the publisher of the channel after a period following the communicating of the kill message, publishing content from the first server in response to the subscription request.

2. The method of claim 1, further comprising:

binding, responsive to the mandatory delivery message being undeliverable to any server instance queues in the messaging middleware, a server instance queue associated with the first server to receive any messages routed using the publisher identifier by the exchange component; and updating an indicator to indicate that the first server is the publisher of the channel.

3. The method of claim 1, further comprising:

deriving the publisher identifier by using the channel identifier as a parameter of a function.

4. The method of claim 1, further comprising:

deriving the priority information corresponding to the first server from the server instance information and the channel identifier.

5. The method of claim 1, further comprising:

configuring, a second kill message to be routed using a publisher identifier by the exchange component;

communicating, from the first server to the exchange component, a second kill message; and causing, responsive to communicating the second kill message, the exchange component to route the second kill message to a set of server instance queues corresponding to a set of other servers;

determining, after a period following the communicating of the second kill message, whether the first server remains the publisher of the channel; and updating, responsive to the first server not remaining the publisher of the channel, an indicator to indicate that the first server is not the publisher of the channel.

6. The method of claim 1, further comprising:

receiving, at the first server from a second server, a second kill message, the second kill message being routed according to a publisher identifier and including priority information corresponding to the second server, and wherein the first server and the second server are both attempting to become publishers of content on the channel;

determining, by comparing the priority information corresponding to the second server from the second kill message with a priority information corresponding to the first server, whether the first server remains the publisher of the channel; and unbinding from the exchange component, responsive to the second server having a higher priority than the first server, not remaining the publisher of the channel, a server instance queue associated with the first server.

7. The method of claim 1, further comprising:

receiving, at the first server from a second server, a second kill message, the second kill message being routed according to a publisher identifier and including priority information corresponding to the second server, and wherein the first server and the second server are both attempting to become publishers of content on the channel;

determining, by comparing the priority information corresponding to the second server from the second kill message with a priority information corresponding to the first server, whether the first server remains the publisher of the channel; and updating, responsive to the first server having a higher priority than the second server, an indicator to indicate that the first server is the publisher of the channel.

8. The method of claim 7, further comprising:

configuring, a third kill message to be routed using a publisher identifier by the exchange component;

configuring the third kill message with the priority information corresponding to the first server;

communicating, from the first server to the exchange component, the third kill message; and causing, responsive to communicating the third kill message, the exchange component to route the third kill message to a set of server instance queues corresponding to a set of other servers.

9. The method of claim 1, further comprising:

receiving the subscription request at the first server; and determining that the subscription request is of a type, wherein the type corresponds to the channel.

10. The method of claim 1, further comprising:

receiving the subscription request at the first server; and hashing a query in the request to obtain a hash value, wherein the hash value corresponds to the channel, and wherein the type corresponds to the channel.

11. The method of claim 1, wherein the session queue is uniquely associated with the client in a messaging middleware, wherein the session queue is bound to the exchange component using the channel identifier as a binding key, wherein the publisher identifier forms a routing key, and wherein the exchange component routes the mandatory delivery message using the routing key.

12. A computer usable program product comprising a computer readable storage device including computer usable code for managing channel ownership in a publish-subscribe data processing environment, the computer usable code comprising:

computer usable code for determining, at a first server, using a processor and a memory, that a subscription request from a client relates to a channel, the channel having a channel identifier;

computer usable code for causing, at an exchange component in a messaging middleware, a session queue associated with the client to bind to the channel;

computer usable code for indicating an intent of the first server to become a publisher of the channel by communicating from the first server a mandatory delivery message to be routed by the exchange component using a publisher identifier, the publisher identifier being related to the channel identifier;

computer usable code for configuring a kill message with a priority information corresponding to the first server, wherein the priority information comprises a server instance information usable to establish a priority of the first server relative to a second server for the channel, wherein the first server and the second server are both attempting to become publishers of content on the channel;

computer usable code for communicating, from the first server to the exchange component, the kill message to be routed by the exchange component using a publisher identifier to a set of server instance queues corresponding to a set of other servers; and computer usable code for beginning, responsive to the first server remaining the publisher of the channel after a period following the communicating of the kill message, publishing content from the first server in response to the subscription request.

13. The computer usable program product of claim 12, further comprising:

computer usable code for binding, responsive to the mandatory delivery message being undeliverable to any server instance queues in the messaging middleware, a server instance queue associated with the first server to receive any messages routed using the publisher identifier by the exchange component; and computer usable code for updating an indicator to indicate that the first server is the publisher of the channel.

14. The computer usable program product of claim 12, further comprising:

computer usable code for deriving the publisher identifier by using the channel identifier as a parameter of a function.

15. The computer usable program product of claim 12, wherein the computer usable code is stored in a computer readable storage device in a server data processing system, and wherein the computer usable code is downloaded over a network to a remote data processing system for use in a computer readable storage device associated with the remote data processing system.

16. The computer usable program product of claim 12, further comprising:

computer usable code for configuring, a second kill message to be routed using a publisher identifier by the exchange component;

computer usable code for communicating, from the first server to the exchange component, a second kill message; and computer usable code for causing, responsive to communicating the second kill message, the exchange component to route the second kill message to a set of server instance queues corresponding to a set of other servers;

computer usable code for determining, after a period following the communicating of the second kill message, whether the first server remains the publisher of the channel; and computer usable code for updating, responsive to the first server not remaining the publisher of the channel, an indicator to indicate that the first server is not the publisher of the channel.

17. The computer usable program product of claim 12, further comprising:

computer usable code for receiving, at the first server from a second server, a second kill message, the second kill message being routed according to a publisher identifier and including priority information corresponding to the second server, and wherein the first server and the second server are both attempting to become publishers of content on the channel;

computer usable code for determining, by comparing the priority information corresponding to the second server from the second kill message with a priority information corresponding to the first server, whether the first server remains the publisher of the channel; and computer usable code for unbinding from the exchange component, responsive to the second server having a higher priority than the first server, not remaining the publisher of the channel, a server instance queue associated with the first server.

18. The computer usable program product of claim 12, further comprising:

computer usable code for receiving, at the first server from a second server, a second kill message, the second kill message being routed according to a publisher identifier and including priority information corresponding to the second server, and wherein the first server and the second server are both attempting to become publishers of content on the channel;

computer usable code for determining, by comparing the priority information corresponding to the second server from the second kill message with a priority information corresponding to the first server, whether the first server remains the publisher of the channel; and computer usable code for updating, responsive to the first server having a higher priority than the second server, an indicator to indicate that the first server is the publisher of the channel.

19. The computer usable program product of claim 18, further comprising:

computer usable code for configuring, a third kill message to be routed using a publisher identifier by the exchange component;

computer usable code for configuring the third kill message with the priority information corresponding to the first server;

computer usable code for communicating, from the first server to the exchange component, the third kill message; and causing, responsive to communicating the third kill message, the exchange component to route the third kill message to a set of server instance queues corresponding to a set of other servers.

20. A data processing system for managing channel ownership in a publish-subscribe data processing environment, the data processing system comprising:

a storage device, wherein the storage device stores computer usable program code; and a processor, wherein the processor executes the computer usable program code, and wherein the computer usable program code comprises:

computer usable code for determining, at a first server, using a processor and a memory, that a subscription request from a client relates to a channel, the channel having a channel identifier;

computer usable code for causing, at an exchange component in a messaging middleware, a session queue associated with the client to bind to the channel;

computer usable code for indicating an intent of the first server to become a publisher of the channel by communicating from the first server a mandatory delivery message to be routed by the exchange component using a publisher identifier, the publisher identifier being related to the channel identifier;

computer usable code for configuring a kill message with a priority information corresponding to the first server, wherein the priority information comprises a server instance information usable to establish a priority of the first server relative to a second server for the channel, wherein the first server and the second server are both attempting to become publishers of content on the channel;

computer usable code for communicating, from the first server to the exchange component, the kill message to be routed by the exchange component using a publisher identifier to a set of server instance queues corresponding to a set of other servers; and computer usable code for beginning, responsive to the first server remaining the publisher of the channel after a period following the communicating of the kill message, publishing content from the first server in response to the subscription request.

* * * * *